Figures 2A, 2B:
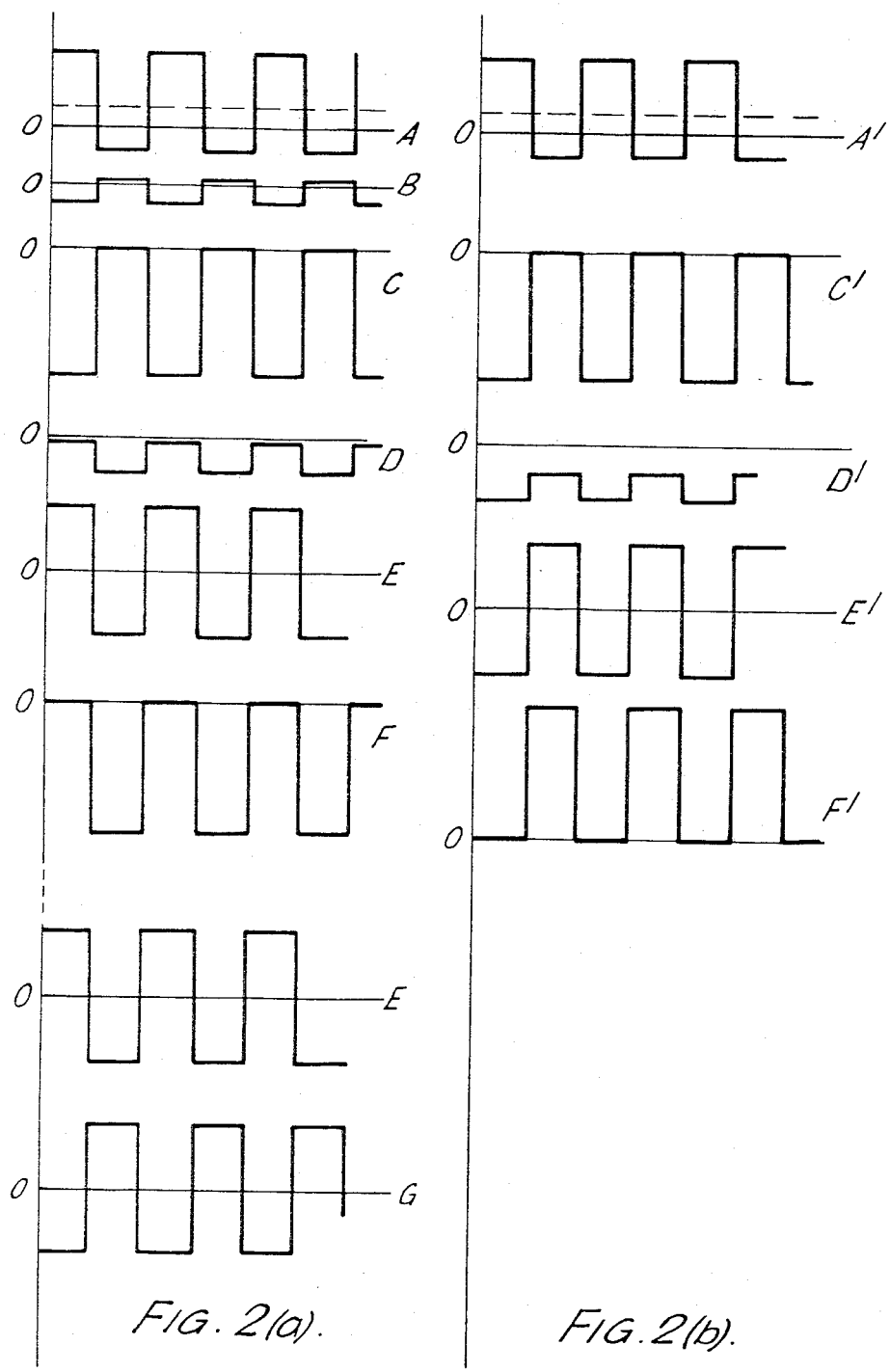

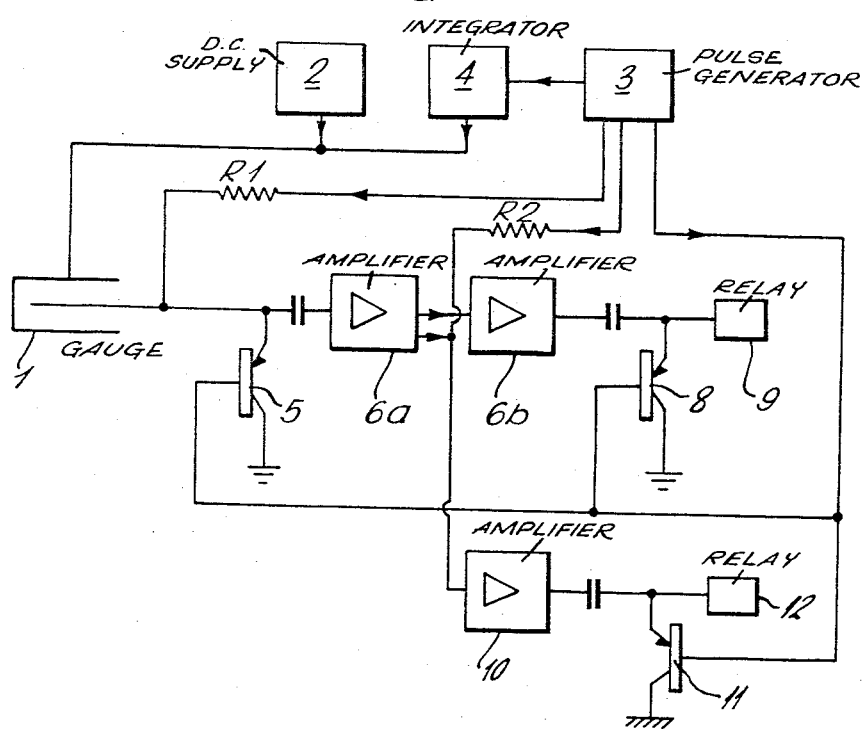

United States Patent Office 3,339,071
Patented Aug. 29, 1967

3,339,071
FLUX MONITOR ELECTRICAL MEASURING SYSTEMS
Eliot Patrick Fowler, Dorchester, Dorset, and Peter Lawrence Railton, London, England, assignors to United Kingdom Atomic Energy Authority, London, England
Filed Aug. 3, 1964, Ser. No. 386,960
Claims priority, application Great Britain, Aug. 15, 1963, 32,390/63
9 Claims. (Cl. 250—83.6)

This invention relates to systems for the electrical measurement of a physical quantity, and in particular to such systems applicable to controlling nuclear reactors.

For example, one important application of the present invention is as a flux monitor for sensing when the neutron flux within a nuclear reactor exceeds a preset level.

Arrangements for controlling nuclear reactors include systems which measure the neutron flux in the reactor, e.g. as the current produced in an ionisation chamber, and operate a trip to shutdown the reactor (or reduce the reactor power) when the flux exceeds a preset level (the trip level) and to give a warning when the indicated flux falls by a predetermined margin below this level. Thus, whereas in normal operation the flux level might be a few percent below the trip level, a margin of, say, 20% would be considered excessive, and an alarm known as the "excess margin alarm," would operate. In addition to indicating that the reactor is being operated incorrectly, an important function of the excess margin alarm is to safeguard against failure of the measuring system itself, e.g. open-circuiting of the polarising and signal connections to the ionisation chamber, which would render the upper level trip inoperative.

In one known arrangement, the current from a D.C.-polarised ionisation chamber is campared with a D.C. reference signal which defines the preset trip level, a mechanical chopper being used to convert the difference signal into an A.C. signal for subsequent amplification in an A.C. amplifier. The output of the A.C. amplifier is applied to a phase-sensitive trip circuit comprising a phase-sensitive rectifier and polarised relay. Under normal operating conditions the relay is held energised, but if the flux rises to such a level that the difference signal becomes zero the amplifier output signal falls to zero and the relay is de-energized. This is the trip operating condition. Further increase of the flux produces an output of reversed phase which maintains the relay contacts even more positively in their de-energised position. The A.C. amplifier output is also displayed on a meter as a "margin-to-trip" indication, and an excess margin alarm circuit is provided by which a second relay is de-energised if this margin exceeds a given percentage of the trip level. The trip level itself can be changed by varying the D.C. reference signal level.

In the case of zero-energy or research reactors, however, which may run for long periods far below normal full power, it is desirable that the trip level be correspondingly low, so low in fact that the provision of an excess margin alarm becomes impractical; nor, in such cases, is it so important to limit the margin from trip at which the reactor operates. Hence, in research reactor control systems proposed hitherto, no excess margin alarm has been included. In one such system, which employs a D.C.-coupled instead of a chopper-type amplifier, a sinusoidal A.C. waveform is superimposed on the D.C. polarising supply to the ionisation chamber for the purpose of monitoring the integrity of the chamber connections and the first stages of the D.C. amplifier.

It is an object of the present invention to provide a versatile system which does not depend on the provision of an excess margin alarm for checking the integrity of the input connections (while permitting such an alarm to be fitted for other reasons if desired), and which allows the use of a chopper-type amplifier, which is inherently safer than the D.C.-coupled type.

In the specification of copending application No. 386,961 of even date there is described a system employing an A.C. reference signal, an input modulator and an A.C. amplifier. The embodiment described therein employs as the reference signal a special rectangular waveform adapted, in the event of failure of the input modulator, to give a demodulated output which corresponds to a trip condition. The present invention provides a system which uses an alternative means of ensuring that the signal applied to the input modulator is of such form as to achieve this "fail-safe" effect.

According to an aspect of the present invention a system for electrical measurement of a physical quantity comprises a transducer yielding a D.C. output dependent on the physical quantity being measured, an A.C. generator for superimposing on said D.C. output, via said transducer, an A.C. reference signal, an input modulator synchronised with said A.C. generator for deriving a mean A.C. signal proportional to the difference between the amplitude of the D.C. output and the amplitude of one portion of the A.C. reference signal, and A.C. amplifier for amplifying said mean A.C. signal, an output demodulator synchronised with said A.C. generator for demodulating the output of the A.C. amplifier, polarity-sensitive trip means controllable by said demodulated output, and means for adding to said superimposed signals prior to modulation, during another portion of the A.C. reference signal, a further A.C. signal of greater amplitude than, and in antiphase with, the A.C. reference signal.

Preferably the A.C. reference signal and said further A.C. signal have square or rectangular waveforms, and preferably the further A.C. signal is fed directly to the input modulator. The input modulator may be a chopper modulator.

When the chopper modulator is functioning correctly, the further A.C. signal has no effect on the input of the A.C. amplifier, since during the portion of the A.C. reference signal during which it is added, the input chopper short-circuits the input, and when the input chopper is open-circuit no further signal is added. However, if the input chopper fails open circuit, the further A.C. signal produces a demodulated output signal corresponding to a trip condition.

To enable the nature of the present invention to be more readily understood, attention is directed by way of example to the accompanying drawings wherein:

FIG. 1 is a block schematic circuit diagram of a reactor control system embodying the present invention FIGS. 2(a) and 2(b) show waveforms in the circuit of FIG. 1 in the cases of correct functioning and failure of the input chopper respectively.

Referring to these figures, there is shown a gauge, shown in FIG. 1 as an ion chamber 1 positively polarised by a D.C. supply 2 on which is superimposed a symmetrical triangular A.C. waveform. The latter is generated in an integrator 4 fed from a generator 3 which generates a symmetrical reference square wave.

The triangular A.C. waveform is differentiated by the inter-electrode capacity of the chamber 1, and gives rise in the chamber to a square-wave reference current, as shown at A in FIGURE 2(a), which is superimposed upon the D.C. output current due to radiation flux, the latter current being indicated by the dashed line.

Waveform A is applied to the emitter of a p-n-p transistor 5 operating as a chopper modulator, whose base is driven by waveform B derived from generator 3, which is also a square wave. It will be seen that waveforms A and B are so synchronised that the output waveform D from the chopper, constituting the input to the A.C. amplifier 6a, 6b, is a mean A.C. signal proportional to the difference between the D.C. output of the chamber and the negative-going portion of the A.C. reference signal. The A.C. component of waveform D, after amplification, is shown at E, and after demodulation by the p-n-p chopper transistor 8 driven in synchronism with the input chopper 5, gives rise to waveform F which is a negative-going square-wave whose mean D.C. level is applied to keep a polarised relay 9 energised. A trip condition arises when the D.C. output current from the chamber 1 rises to such a value that the negative-going portion of the reference waveform (see FIG. 2(a) A) coincides with zero. The amplifier output then disappears and the relay 9 is deenergised. Further increase of the output current causes the phase of the amplifier output to reverse, converting F into a positive-going waveform whose mean D.C. level is inoperative to re-energise the polarised relay 9.

Also fed to the emitter of transistor 5 via resistor R1 is the further A.C. signal shown at C. This is a negative-going current square-wave added in antiphase to the reference A.C. current shown at A, during the portion of that waveform when the transistor 5 effectively short-circuits the input. The amplitude of waveform C is larger than that of the reference waveform, as shown. So long as the chopper is operating properly, the waveform C has no effect on the circuit, because no current is added during the portion of the reference waveform during which the chopper is detecting the difference signal which is fed to the input of the A.C. amplifier. However, should the input chopper 5 remain open-circuit, the waveforms shown in FIG. 2(b) are produced. The A.C. component of the waveform D' fed to the amplifier input is of opposite phase to waveform D, giving rise to the demodulated output waveform F' whose mean D.C. level is positive and hence ineffective to keep the polarised relay 9 energised. The trip is thus operated.

An excess margin alarm may be arranged by comparing a second A.C. reference signal with the normal mean A.C. signal, in antiphase therewith, so that the signals subtract. Such a waveform is shown at G in FIG. 2(a), and may be added via a resistor R2 to an output taken from the amplifier 6a prior to demodulation. In normal operation the amplified A.C. input signal is smaller than the second A.C. reference signal, and the phase of the amplifier 10 output is determined by the second A.C. reference signal, which, after demodulation by 11, keeps a further polarised relay 12 energised. As the flux falls, the amplified A.C. input signal increases, until at a preset amplitude of the second A.C. reference signal, corresponding to the excess margin value, it exceeds the latter, reverses the phase of the amplifier 10 output, and so causes the further polarised relay 12 to be deenergised.

We claim:

1. A system for electrical measurement of a physical quantity comprising a transducer yielding a D.C. output dependent upon the physical quantity being measured, an A.C. generator for superimposing on said D.C. output, via said transducer, first A.C. reference signal, an input modulator synchronised with said A.C. generator for deriving a mean A.C. signal proportional to the difference between the amplitude of the said D.C. output and the amplitude of one portion of the A.C. reference signal, an A.C. amplifier for amplifying said mean A.C. signal, an output demodulator synchronised with said A.C. generator for demodulating the output of the A.C. amplifier, polarity-sensitive trip means controllable by said demodulated output and means for adding to said superimposed signals prior to modulation, during another portion of the A.C. reference signal, a further A.C. signal of greater amplitude than, and in antiphase with, the A.C. reference signal.

2. A system for electrical measurement of a physical quantity as claimed in claim 1 in which said A.C. reference signal and said further A.C. signal have rectangular wave forms and the further A.C. signal is fed directly to the input modulator.

3. A system as claimed in claim 1 in which said first A.C. reference signal is adjustable to define a given level of trip signal.

4. A system as claimed in claim 1 in which means are provided for adding a second A.C. reference signal to the said amplified mean A.C. signal the latter being in normal operation smaller than the second A.C. reference signal, applying the sum of these signals to a demodulator through a further amplifier and a phase sensitive relay controlled by the demodulated output of the further amplifier.

5. A system as claimed in claim 4 in which the amplitude of the second A.C. reference signal is preset to a value corresponding to a predetermined excess margin value.

6. An electrical measuring system for a nuclear reactor adapted to effect operation of a trip mechanism to shut down the reactor when predetermined flux level is exceeded comprising a neutron flux responsive ion chamber yielding a D.C. output, a source of D.C. potential, an A.C. reference signal generator, connections applying to the polarising electrode of said chamber a D.C. polarising potential having imposed thereon a first A.C. reference signal from said generator, an input modulator connected to modulate the output of the ion chamber and to pass the modulated signal to an A.C. amplifier whereby the A.C. amplifier input is a signal proportional to the difference in amplitude of the D.C. output from the chamber and the amplitude of one portion of the A.C. reference signal, an output demodulator synchronised with the A.C. generator and a phase sensitive relay energised to hold off said trip mechanism by the output from the demodulator until the flux level is exceeded, means adding to the superimposed signals prior to modulation during another portion of the A.C. reference signal a further A.C. signal of greater amplitude than, and in antiphase with, the A.C. reference signal.

7. An electrical measuring system as claimed in claim 6 including a source of a second A.C. reference signal, means for subtracting the second A.C. reference signal from the amplified modulated mean A.C. signal prior to its demodulation, a further amplifier connected to receive the resultant signal, a phase sensitive trip means operable by the output of said further amplifier.

8. A flux monitor for sensing when the neutron flux within a nuclear reactor exceeds a preset reference comprising a flux gauge for yielding a D.C. signal denoting the level of flux, said gauge being of a kind wherein its output can be modulated with an alternating current by an alternating voltage applied to the gauge in order to check on the electrical connections to the gauge, a means for applying to the gauge an alternating voltage to modulate said D.C. signal with an alternating current whose peak amplitude corresponds to a preset reference, a chopper amplifier for the modulated D.C. signal which amplifier is synchronized with the alternating current to select for amplification only that part of the modulated signal which corresponds to the difference between the D.C. signal and the preset reference, and means for injecting an alternating current onto the input of the chopper amplifier of opposite polarity to the first mentioned alternating current and of greater amplitude to check the operation of the chopper amplifier, said injected alternating current being rejected if the chopper amplifier operates correctly, and said injected alternating current being accepted if the chopper amplifier functions incorrectly to effectively charge the effective zero so that the output of the amplifier will correspond to the D.C. signal exceeding the reference.

9. A flux monitor according to claim 8 including a means for comparing the signal level within said chopper amplifier with a further reference.

References Cited

UNITED STATES PATENTS 2,951,187  8/1960  McGrath _____ 324—118 X
3,065,348  11/1962  Cockbaine et al. ____ 250—83.6

FOREIGN PATENTS 893,907  4/1962  Great Britain.

RALPH G. NILSON, *Primary Examiner.*
ARCHIE R. BORCHELT, *Examiner.*
S. ELBAUM, *Assistant Examiner.*